(12) United States Patent
Parikh et al.

(10) Patent No.: US 6,408,177 B1
(45) Date of Patent: Jun. 18, 2002

(54) SYSTEM AND METHOD FOR CALL MANAGEMENT WITH VOICE CHANNEL CONSERVATION

(75) Inventors: Sanjiv Parikh, Fremont, CA (US); Eric William Burger, McLean; Thomas Richard Beres, Reston, both of VA (US)

(73) Assignee: SS8 Networks, Inc., San Jose, CA (US)

( * ) Notice: Subject to any disclaimer, the term of this patent is extended or adjusted under 35 U.S.C. 154(b) by 0 days.

(21) Appl. No.: 09/501,058

(22) Filed: Feb. 9, 2000

(51) Int. Cl.[7] .............................. H04M 3/42; H04Q 7/20
(52) U.S. Cl. ........................ 455/414; 455/417; 455/415; 455/466
(58) Field of Search ................................ 455/414, 412, 455/413, 415, 416, 417, 418, 466; 379/88.19

(56) References Cited

U.S. PATENT DOCUMENTS

| | | | | |
|---|---|---|---|---|
| 5,329,578 A | * | 7/1994 | Brennan et al. | 379/88.19 |
| 5,548,636 A | * | 8/1996 | Bannister et al. | 379/201 |
| 5,581,604 A | * | 12/1996 | Robinson et al. | 379/88.13 |
| 5,742,905 A | * | 4/1998 | Pepe et al. | 455/461 |
| 5,937,040 A | * | 8/1999 | Wrede et al. | 379/93.23 |
| 5,946,386 A | * | 8/1999 | Rogers et al. | 379/265 |
| 5,960,064 A | * | 9/1999 | Foladare et al. | 379/88.26 |
| 5,970,388 A | * | 10/1999 | Will | 340/7.29 |
| 6,005,870 A | * | 12/1999 | Leung et al. | 370/466 |
| 6,122,348 A | * | 9/2000 | French-St. George et al. | 379/88.23 |
| 6,129,413 A1 | * | 4/2001 | Burg | 379/215 |
| 6,285,364 B1 | * | 9/2001 | Giordano, III et al. | 345/804 |
| 6,310,949 B1 | * | 10/2001 | Taylor et al. | 379/219 |

FOREIGN PATENT DOCUMENTS

WO    PCT/US01/04019    4/2001

\* cited by examiner

*Primary Examiner*—Nay Maung
*Assistant Examiner*—Erika A. Gary
(74) *Attorney, Agent, or Firm*—Pennie & Edmonds LLP

(57) ABSTRACT

A system and method for providing a call management service subscriber with options for handling incoming calls, without using voice channel resources, is disclosed. When an incoming call is received by the call management system, caller information and menu options are provided to the subscriber in text form on a display, using a data channel, rather than in spoken form over a voice channel. This conserves air time and network resources while providing the subscriber with call handling options in a convenient and user-friendly form.

55 Claims, 7 Drawing Sheets

| |
|---|
| Subscriber Identification |
| SMS Message Identification |
| Time SMS Message Sent |
| Time SMS Message Delivered |
| Call Disposition |

FIG. 7a

650-555-1212
John Doe

Reply to this call by pressing:

1. To Take Call
2. To Send Call to Voicemail
3. To Send Call to Voicemail and Eavesdrop
4. To Forward Call to Default Number
5. To Forward Call to Another Number
6. To Reject Call
7. To Hold Call for Pickup
8. To Request Callback Number

FIG. 7b

SYSTEM AND METHOD FOR CALL MANAGEMENT WITH VOICE CHANNEL CONSERVATION

The present invention relates generally to communications systems, and specifically to systems and methods for providing telephone call management services such as call forwarding and call screening in conjunction with subscribers using mobile telephones.

BACKGROUND OF THE INVENTION

Call management applications provide subscribers with options for handling incoming telephone calls. For example, a simple call management application might provide a subscriber with the caller's calling line identification (CLID) on a display, allowing the subscriber to identify the caller and to accept or ignore the call based on the identity of the caller (or based on the lack of call line identification when the caller has blocked the transmission of his/her CLID). Or, the subscriber may program the system to treat different callers differently, based on CLID: the subscriber may block or reject certain calls, and accept others. Alternatively, the subscriber may program the system, using the subscriber's handset, to provide distinctive rings based upon CLID, and then decide to accept or ignore the call based upon the ring. Or, the system may be programmed to not even ring for certain CLIDs, and instead to transfer calls from those CLIDs directly to voicemail or to a forwarding number.

A menu-based call management system is more flexible than the call management applications described above. FIG. 1 is an illustration of a prior art menu-based call management system, the Call Assistant product of Centigram Communications Corporation. It provides a subscriber with information about a caller, and with a menu of options for handling the incoming call. The caller may record a brief introduction, which is included in the spoken menu. The subscriber may choose to take a call, forward it, reject it, or send it to voicemail. Other options, such as sending a call to voicemail, but eavesdropping on the call and perhaps deciding to pick up the call, may also be available. The prior art system uses a spoken user interface—that is, voice channels 105—to send a subscriber menu options. For example, the subscriber 107, on picking up the call from the call management system 104, may hear a message such as "You have received a call from John Doe. To accept this call, press 1. To reject the call, press 2. To transfer the call to voicemail, press 3. To forward the call, press 4, and then enter the forwarding number." Some prior art call management systems have interfaces that accept spoken user commands as well as commands entered using a telephone DTMF keypad.

There are several disadvantages to the prior art call approaches. Merely providing CLID information, based on which the subscriber may ignore, answer or reject calls, gives the subscriber very limited options. In such systems, pre-answer services, such as voice call screening, are not available. If the subscriber has programmed his handset to accept or reject calls, or ring or direct calls to voicemail, based upon CLID information, this information must be re-programmed into each handset used by the subscriber. If the handset is lost, or the settings are inadvertently erased, the programming will be lost as well. The subscriber lacks flexibility to respond differently to a particular CLID at different times or under different circumstances. Furthermore, CLID information may not be available, and even when available is not always sufficient to identify the caller. For example, the caller may be calling from an unknown number, such as a pay phone, or may purposely manipulate his CLID to disguise the origin of the call. Thus, approaches based on CLID alone are somewhat inflexible and are vulnerable to deception and loss of programming information.

The prior art menu-based call management systems also have several shortcomings relating to the spoken user interface. Presenting menu options using a spoken user interface can take a significant amount of time. This uses "air time" and network resources, which must be paid for, most likely by either the subscriber or the call management service. Use of air time also impacts the number of users that can be serviced by the network. The air time required, and therefore the cost and use of limited resources, increases with the number of options provided. It would therefore be desirable to provide a user interface which does not require the use of a voice channel.

Furthermore, a spoken user interface can be confusing to the subscriber, since the subscriber must remember the various options available and how to select a desired option. This confusion and difficulty remembering options increases with the number of options provided. On the other hand, providing several options for call handling is clearly useful, providing the subscriber with additional flexibility. It is therefore desirable to provide a user interface which is easy to use and does not require the subscriber to remember the available options.

A spoken user interface is disadvantageous in a noisy environment, where the subscriber may be unable to hear the spoken menu options. It is also disadvantageous in a quiet environment, such as a meeting, where the subscriber may not want to have to listen to a menu and thereby miss what is being said at the meeting and/or may not want to have to speak in order to select an option.

In addition to the disadvantages of the spoken user interface, the prior art menu-based call management systems require the subscriber to respond in a relatively short period of time—before the caller hangs up or is transferred to voicemail. If the subscriber receives a call in a noisy or quiet environment, he may want to take the call or otherwise respond, but may not be able to do so immediately. However, by the time the subscriber leaves the environment, the call will likely have been missed. It is therefore desirable to provide some mechanism to allow the subscriber to respond to the call and either indicate that the call will be returned, or request a return call, without having to speak.

SUMMARY OF THE INVENTION

In summary, the present invention is a system and method for providing a subscriber with a display menu of options for handling incoming calls, using a data channel to transmit the menu information. The present invention thus advantageously avoids the use of a voice channel, so that valuable air time is not spent transmitting menu option data. A voice channel is used only if the subscriber chooses to take the call. The present invention also advantageously avoids subscriber confusion and inability to hear selections in a noisy environment by presenting the menu options in a text format. For example, the menu options can be displayed on the display screen in the subscriber's mobile handset.

The subscriber may respond with a selection of a menu option, and this selection may also be transmitted over a data channel. The use of a data channel to transmit the subscriber's menu selection advantageously avoids the problem of requiring the user to speak into the handset in an environment where the subscriber prefers not to speak.

BRIEF DESCRIPTION OF THE DRAWINGS

Additional objects and features of the invention will be more readily apparent from the following detailed description and appended claims when taken in conjunction with the drawings, in which:

FIG. 7a illustrates a data base record structure for call records maintained by the call management system.

FIG. 7b illustrates an example menu provided to a subscriber in accordance with one embodiment of the invention.

DESCRIPTION OF THE PREFERRED EMBODIMENTS

In the present invention, menu information is sent to a subscriber's mobile telephone handset via a data channel, instead of a voice channel. Using a data channel conserves valuable air time and network resources, and facilitates providing an easy-to-use visual display of menu options to the user. The data channels used by mobile (cellular) telephone service providers to provide Short Message Service (SMS) may conveniently be used to provide the menu information. SMS is currently available to provide its subscribers with information in short message format, such as stock prices or sports scores, and allows subscribers to send short messages to the Short Message Service Center (SMSC). Cellular telephones are already configured to transmit and receive data over an SMS data channel, and thus implementation of the present invention does not require building additional network equipment to transmit and receive data, and does not require subscribers to purchase new handsets or separate call handling devices.

Figure 2:
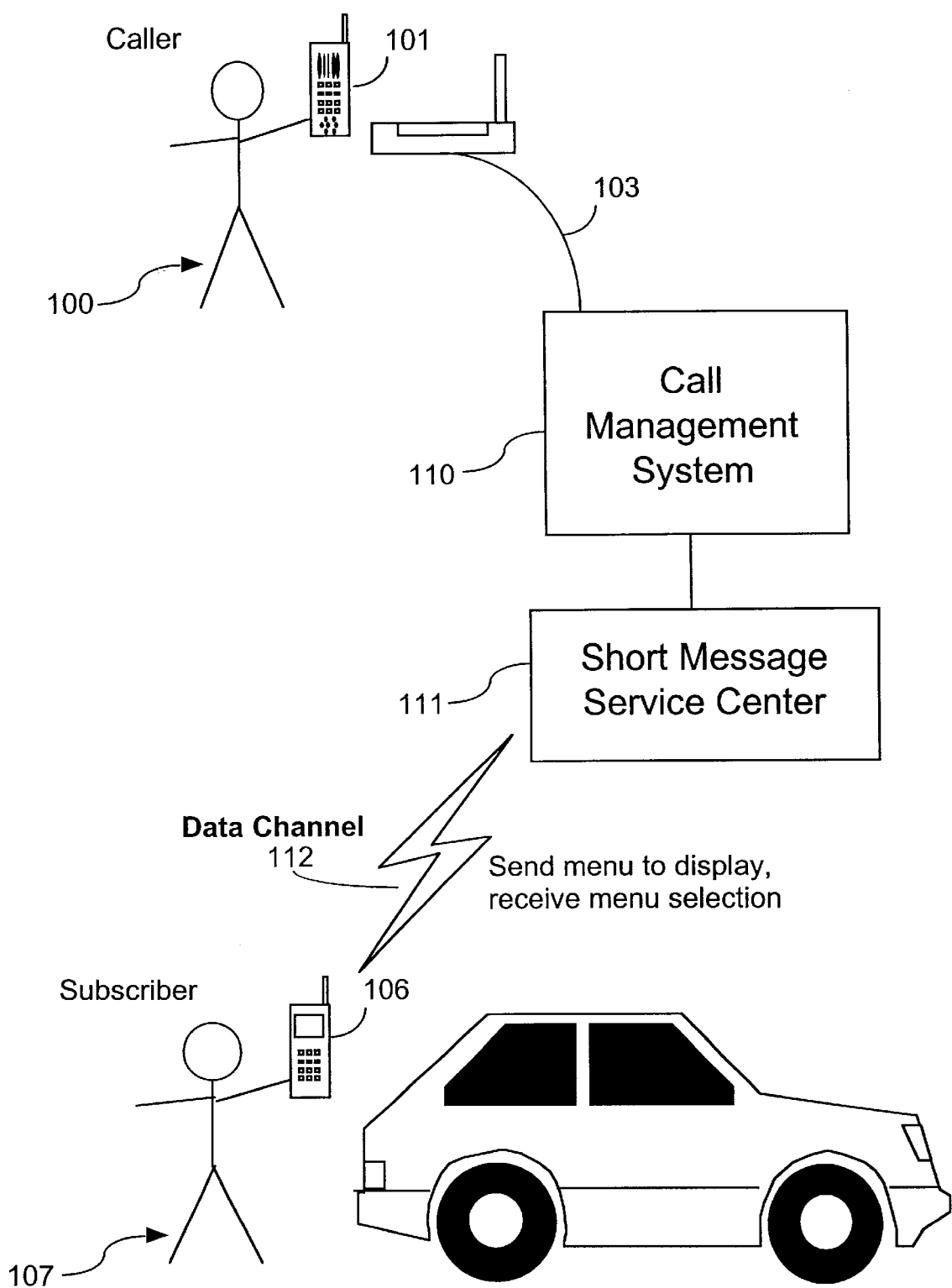
FIG. 2 is an illustration of a call management system in accordance with one embodiment of the invention.

As shown in FIG. 2, the caller 100 places a call to the subscriber 107. However, the actual "destination" of the number called by the caller 100 is a call management system 110 which manages calls for the subscriber. The call management system 110 assembles a message including the telephone number of the subscriber, the caller's telephone number (i.e., the CLID) or other identifying information, and other appropriate text to display a menu of options available to the subscriber on the phone's display. The call management system 110 sends the message to a SMSC 111, which then sends a short message to the subscriber's telephone 106 via an SMS data channel 112.

The subscriber 107 responds by pressing one or more keys on the handset keypad to select a menu opinion and then pressing the send button on the handset 106. This response is sent to the SMSC 111 via the SMS data channel 112. The SMSC 111 sends the response to the call management system 110, which then takes action depending on the option selected by the subscriber 107. For instance, the call management system 110 may connect the caller 100 to the subscriber's handset, send the call to voicemail, forward the call, or reject the call.

Other options, such as sending the call to voicemail, but allowing the subscriber to eavesdrop on the voicemail and potentially to pick up the call, may also be provided. This option requires a three-way connection between the caller 100, the voicemail system, and the subscriber's handset 106 receiver, using two voice channels simultaneously. A full duplex, bi-directional voice connection between the caller and the subscriber's handset 106 is generally not desirable during eavesdrop, since this would allow the caller 100 to hear the subscriber. Instead, the call management system 110 blocks the return voice path from the subscriber's handset from being connected to the caller, but maintains a bi-directional connection between the call management system 110 and the handset 106 to enable the subscriber 107 to send a command to the call management system 110 to interrupt the voicemail session and take the call, either through a spoken instruction, or by pushing a button, e.g. "send," on the handset to send a DTMF tone to the call management system 110, or even by sending a data message via the SMSC 111.

Two other options may be provided, permitting the subscriber to respond to the caller without taking the call. When the subscriber selects a "hold call" option, the call management system 110 plays a message asking the caller to hold, indicating that the subscriber 107 will pick up the call shortly. The call management system 110 then waits until the subscriber 107 sends a command to the call management system 110, e.g., by pushing "send," to connect the call. If another option, "request callback," is selected by the subscriber, the call management system 110 informs the caller that the subscriber wishes to call him back, and asks the caller to leave a callback number. The call is then connected to voicemail. This option has an advantage over ordinary voicemail, as the caller is assured that the subscriber is aware of the call and intends to call back shortly.

Figure 3:
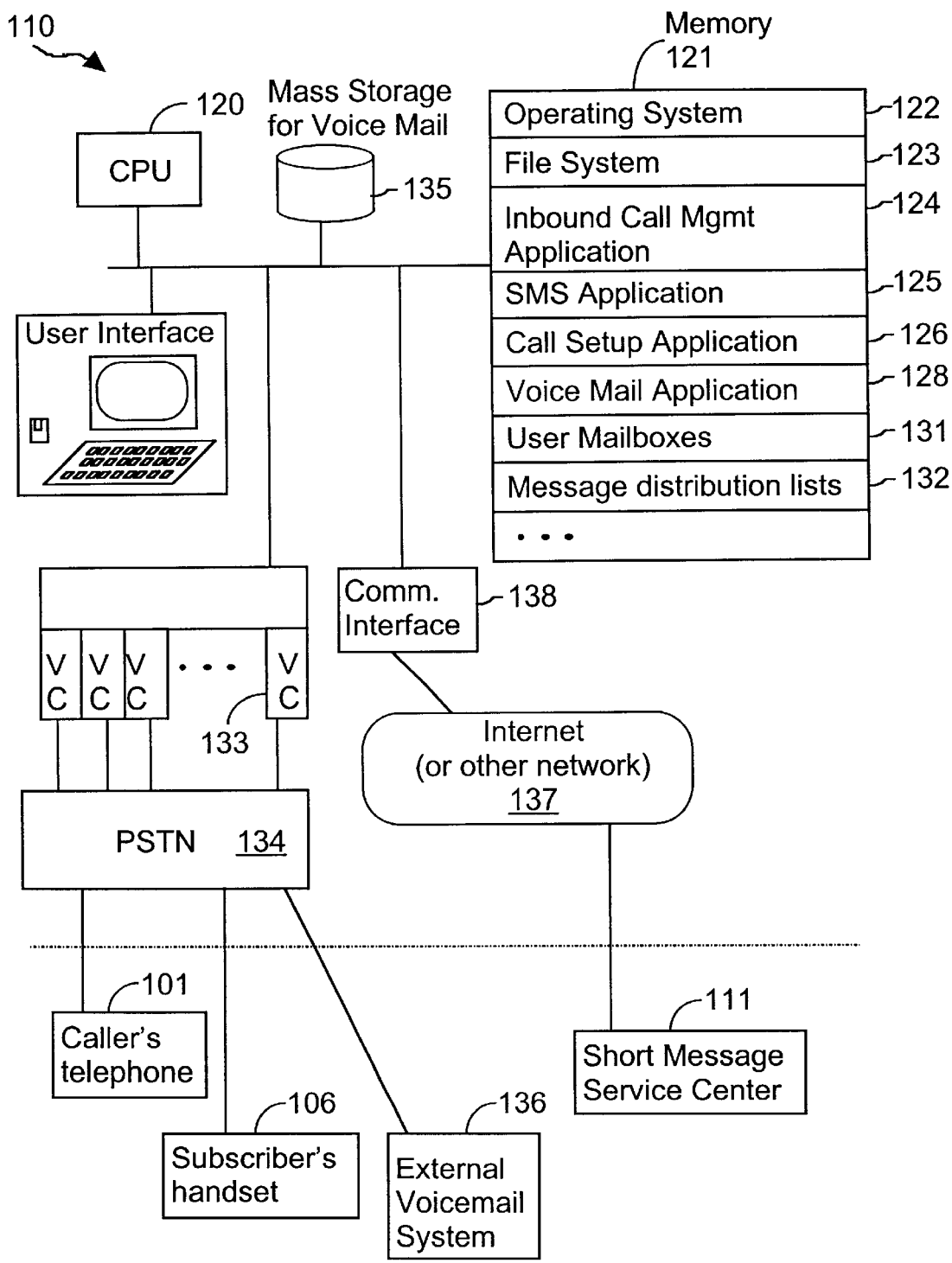
FIG. 3 is a block diagram of a call management system in accordance with one embodiment of the invention.

FIG. 3 is a block diagram of a call management system 110. The call management system includes a central processing unit 120, and memory 121 for storing an operating system 122, a file system 123, and several applications for handling calls. The operating system and file system provide basic system services such as input/output operations, process management, and file management. Memory 121 also stores various data structures used by the internal voicemail system, including user mailboxes 131 and message distribution lists 132, while the compressed audio data comprising the messages stored by the voicemail system are stored on mass storage 135.

Telephone calls are directed to the call management system 110 by the public telephone network 134 in accordance with each subscriber's "public" telephone number. The subscriber's public telephone number is typically a direct inward dial telephone number assigned to the call management system 110. Alternately, the subscriber's directory number may be mapped to the call management system from the subscriber's directory number using standard call forwarding, selective call acceptance, an Advanced Intelligent Network (AIN) trigger, or other delivery trigger method (e.g., by resetting the home location register (HLR) maintained by a wireless telephone network company to a number associated with the call management system 110).

The subscriber will also generally have a number of private telephone numbers, including telephone numbers for the subscriber's mobile handset 106, home and office telephone numbers, facsimile telephone numbers and so on.

Whenever the call management system 110 receives a telephone call on behalf of a subscriber, the call is received by one of the system's voice cards 133, which receives from the public telephone network both the direct inward dial number that is being called, and the CLID of the caller 101, as well as other call parameters that are not relevant to the present discussion. This information is passed by the voice card 133 to an inbound call management application 124. Each of the voice cards 133 provides a voice channel between the call management system and other devices or parties.

The inbound call management application 124 examines incoming call data and identifies the subscriber and the caller. That is, the inbound call application looks at the CLID portion of the call data to identify the caller and looks at the called number portion of the call data to identify the subscriber. The inbound call management application 124 also manages the other applications for handling calls: an SMS application 125, a call setup application 126, a voicemail application 128, and any other call handling applications that the call management system may use. The internal voicemail application 128 records voicemail messages for subscribers, storing the messages on mass storage 135 in the call management system 110. Even when the system includes an internal voicemail application 128, some particular subscribers may be configured to use an external voicemail system 136.

The SMS application 125 assembles the short message (described below) to send to the subscriber, sends the message to the SMSC 111, tracks whether that message has been received by the subscriber and whether the subscriber has responded within a given specified period of time, receives delivery receipts and subscriber responses from the SMSC, and forwards that information to the inbound call management application 124. Based on information received from the SMS application, the inbound call management application 124 may: instruct the call setup application 126 to forward the call to a forwarding number or to an external voicemail system 136; play a "call rejected" message and disconnect the incoming call; or connect the call to the internal voicemail application 128. Other options may also be provided.

The short message service center SMSC 111 may be coupled to the call management system 110 via a data channel routed through the Internet 137 (via a communication interface 138 coupling the call management system 110 to the Internet) or other data communication network using the SMPP (short message point-to-point protocol). Alternately, the SMSC 11 may be coupled to the call management system 110 via a data channel routed through the public switched telephone network, or may even be directly coupled to the call management system 110.

The call setup application 126 may provide several possible forwarding options. Calls may be forwarded to a default number, or to one of a small number of previously established forwarding numbers, or to a number entered by the subscriber after selecting the call forwarding option. In one embodiment, the user commands corresponding to these three different call forwarding options are: 4-SEND, 5-<single digit>-SEND, and 5-<multidigit telephone number>-SEND, respectively, where 4 indicates forwarding to a default number, and 5 indicates forwarding to a previously established number if followed by a single digit and otherwise indicates forwarding to a user specified telephone number.

Calls may be forwarded with supervision—that is, the call management system may place the call to the forwarded number, and then connect the incoming call to the forwarded number only after a connection has been established. This option may be desirable, for example, when forwarding to an unknown number keyed in by the subscriber, instead of a default which is known to be reliable. Alternatively, calls may also be forwarded blindly —the call management system may connect the incoming call to the forwarded number without waiting for a response from the forwarded number. This option may be more appropriate when the forwarding number is a trusted number, such as a default forwarding number or an external voicemail system.

When performing a transfer, the call management system 110 can instruct a switch in the public switched telephone network 134 to bridge the call, thereby freeing the system 110 to process more calls, because after the transfer the call is no longer routed through the call management system 110. In addition, by using a switch bridge instruction, the number of telephone network ports used to process the call is reduced from four to two, thereby preserving telephone network resources as well. For supervised transfers, the bridge instruction may be used after the connection to the forwarding number is established. For blind transfers, the call management system 110 can use the release-link trunk (RLT) or release-to-pivot (RTP) functionality of the telephone switches in the public switched telephone network 134 to redirect the inbound call without using an outbound trunk line of the call management system at all. As a result, after the transfer the call is no longer routed through the call management system.

The call setup application 126 manages the three-way connection required for voicemail with eavesdrop. The call setup application 126 also handles dropping the connection to the voicemail application or voicemail system and connecting the subscriber to the caller if the subscriber decides to pick up the call during eavesdrop.

The voicemail application 128 receives and stores voicemail messages. Other applications not relevant to the present discussion provide the subscribers with access to their voicemail messages. The voicemail application 128 can also provide the subscriber with various options such as multiple greetings and multiple voicemail boxes. Alternatively, the subscriber may use an external voicemail system 136, if there is no internal voicemail application 128 or if the subscriber simply prefers to use a different voicemail system. Using an external voicemail system typically requires either the use of a dedicated trunk line, or some means for communication between the call setup application 126 and the external voicemail system 136. If a dedicated trunk line is not used, the external voicemail system must be provided with information about each call that is transferred to it. At a minimum, the external system must receive the subscriber's information, to identify the voicemail box, and the reason for the call. That is, the external voicemail system must be informed that the call is being placed so that the caller can leave a voicemail message in the subscriber's voicemail box. Otherwise, the voicemail system may treat the call as though it is from a subscriber wishing to access his voicemail. The information may be provided through pre-arranged proprietary signaling between the call management system and the external voicemail system. Or, the information may be provided by manipulating the calling number, redirecting number and redirection reason parameters provided in a setup message to the PSTN switch, using ISDN PRI (primary rate interface) or SS7 protocols. The call setup application 126 sets the calling number parameter in the setup message to the caller's number, or CLID, received by the call management system. The redirecting number in the setup message is set equal to the number dialed by the caller to reach the subscriber, e.g., the subscriber's public (directory) telephone number. Finally, the redirection reason may be set equal to any one of various predefined call forwarding reasons, such as: call forward due to no answer (CFNA), call forward due to busy (CFB), or call forward all calls (CFA). These are the same values for the setup message as would be used if the call had been transferred directly from a subscriber's directory number to voicemail.

Other options for handling the incoming call, in addition to those described above, may be provided, and such options will be readily apparent to those of skill in the art.

Call Management Using SMS Call Management Message

Figure 1:
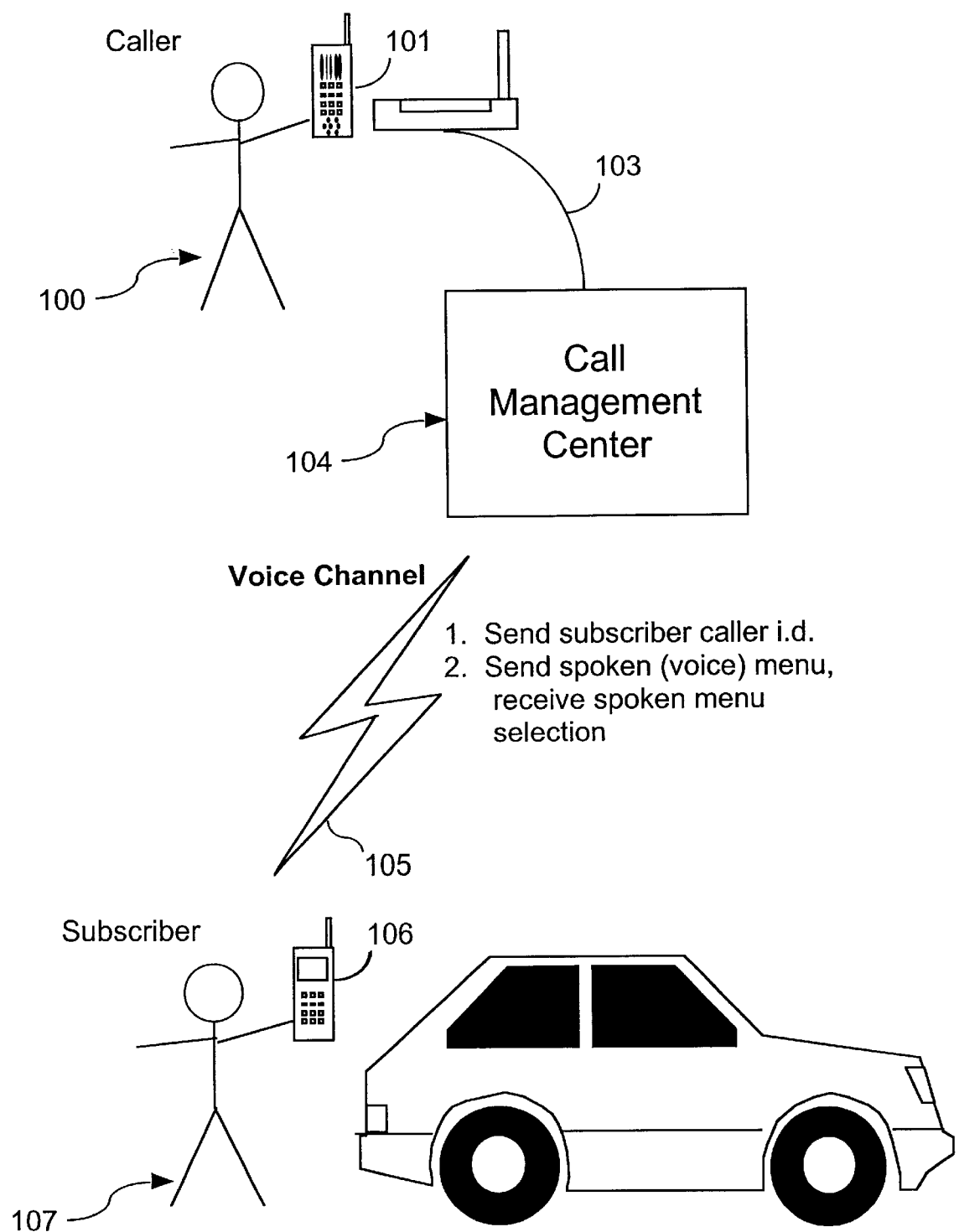
FIG. 1 is an illustration of a prior art call management system.
Figure 4:
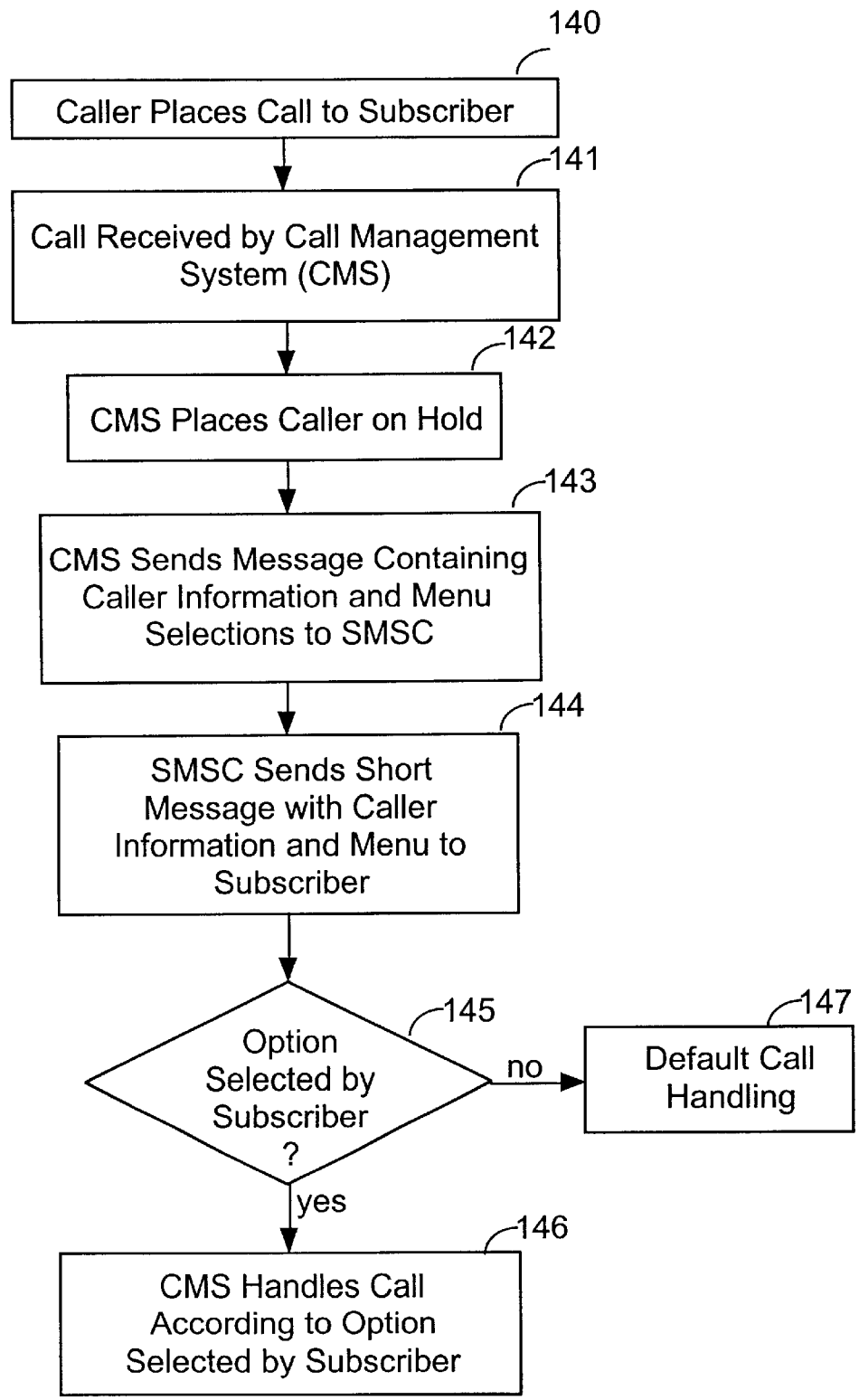
FIG. 4 is a flowchart of the steps for handling an incoming call in accordance with one embodiment of the invention.

FIG. 4 is a block diagram of the primary steps performed by the system illustrated in FIG. 1. First, the caller places a call to the subscriber 140. The caller may use a standard telephone, a cellular or other wireless telephone, or even an IP (Internet protocol) phone to make the call. The call management system receives the incoming call 141 through one of a number of possible techniques. The subscriber's directory number may be mapped to the call management system from the subscriber's directory number using standard call forwarding, selective call acceptance, an Advanced Intelligent Network (AN) trigger, or other delivery trigger method. Alternatively, the subscriber's directory number may be a direct-inward dial number of the call management system. In the latter case, the subscriber's "real" directory numbers (for the subscriber's mobile telephone, home, office and so on) may be private numbers that are not publicly divulged by the subscriber. Any method for allowing callers to call a subscriber may be used, so long as the call presents a token identifying the subscriber, such as the subscriber's directory number, direct-inward dial number, mailbox number, or CLID or caller name.

Having received the call, the call management system places the caller on hold 142. The call management system then sends the SMSC a message containing caller information and menu selections 143. The message also includes a message identification number, to enable the call management system to track the message and associate any response or delivery receipt with the incoming call, and subscriber information to enable the SMSC to provide the message to the subscriber. The SMSC then sends the message to the subscriber 144 using the subscriber identification information provided by the call management system. The message is transmitted over an SMS data channel to the user's mobile telephone.

The subscriber may either select an option or ignore the call 145. If the subscriber ignores the call, or does not respond within a predetermined period of time, the call management system performs default call handling, e.g., transferring the call to voicemail. This default handling may be set for all subscribers by the call management system, or may be selectable by the subscriber. If the subscriber selects an option within the predetermined period, the call management system handles the call accordingly 146.

The SMS automatically receives a receipt message from the subscriber's telephone when a data message sent by the SMSC is received by the mobile telephone. When no message receipt is received, this indicates that the subscriber's telephone is off or otherwise unable to receive the call information message.

Call Management When CLID is Not Available

Figure 5:
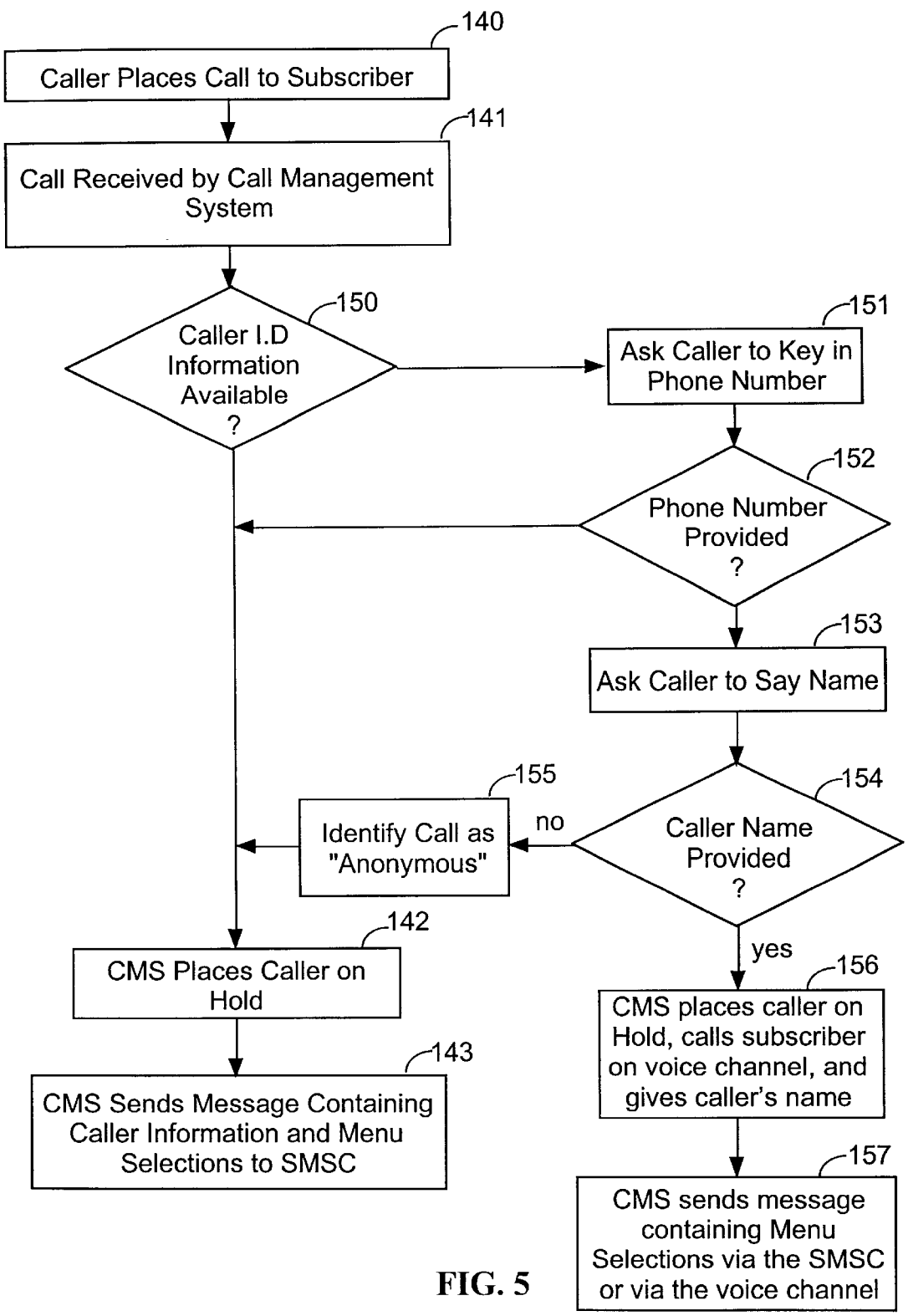
FIG. 5 is a detailed flowchart of the steps for providing information to a subscriber in accordance with one embodiment of the invention.

FIG. 5 shows a call management method used when the caller's CLID information is not be available 150. If the CLID is not available, the call management system may handle the call in one of several different ways. For instance, the call management system may ask the caller to key in his phone number 151. The call management system make ask the caller to say his name into the phone 153, record what the caller says, and then play back what it recorded (which may or may not include the caller's name) to the subscriber via a voice channel 156. The call may be identified as "anonymous" in the short message to the subscriber 155, so that the subscriber may decide whether or not to take the call. A message containing a menu of call handling options may be delivered via the SMSC, as described above, or may be delivered orally via the voice channel, since a voice channel is already being used to deliver the caller's spoken name (157). Alternatively, the center may simply reject any anonymous calls, or calls where the CLID is not available. Of course, these options for handling calls without CLID may be selected, prioritized or ordered differently than shown in the flow chart of FIG. 5—for example, the caller may be asked to key in his number, and if he does not do so, the call may be labeled "anonymous," without the option of the caller speaking his name. These options may be selected by the subscriber, in setting up his call screening options, or may be determined for all subscribers by the call management system.

Figure 6:
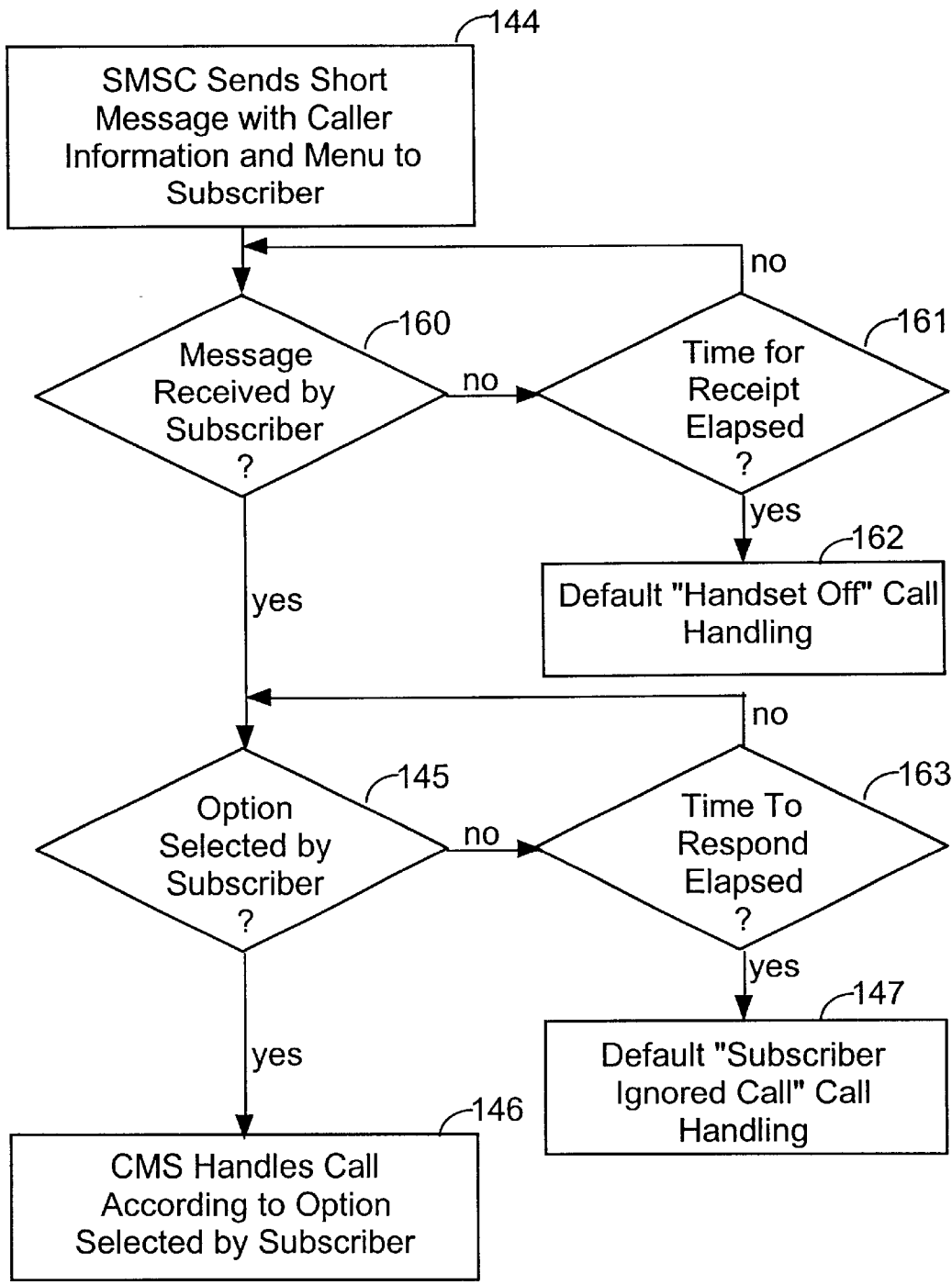
FIG. 6 is a detailed flowchart of the steps for handling the call using timeout default modes in accordance with one embodiment of the invention.

The block diagram of FIG. 6 addresses the possibility that the subscriber may not receive the short message including the menu options, or may receive the message but not respond, or not respond in a timely manner. For example, the subscriber may not receive the message because his handset is turned off, or because of an equipment failure at the SMSC. Or, the subscriber may not respond in a timely manner because he is choosing to ignore the call, because the subscriber does not know that his handset has received the short message (e.g., because he or she did not hear the message received tone or ring), or because of an intervening equipment failure.

The call management system determines whether the message has been received as follows. As shown in FIG. 7a, each SMS message sent by the call management system includes an SMS message identification, and the call management system requests a delivery receipt from the SMSC (160). The subscriber's handset automatically acknowledges receipt of each SMS message, without requiring any action by the subscriber, to inform the SMSC that the message has been received. If the SMSC does not receive an acknowledgment from the subscriber's handset, it does not send a delivery receipt to the call management system. When an acknowledgment is received from the subscriber's handset, the SMSC sends a delivery receipt containing the SMS message identification, thereby letting the call management system know which SMS message has been delivered to the corresponding subscriber.

Upon the elapse of a predetermined period (161, 160) without return of a delivery receipt corresponding to the SMS message identification 160, the call management system will handle the incoming call in accordance with a previously established "handset off" call disposition 162, for example by transferring the call to voicemail.

Similarly, the call management system determines whether the subscriber has selected an option in a timely manner by waiting a predetermined period of time from, for example, the time the delivery receipt is sent 163. If the subscriber has not selected an option 145, the call management system handles the call in accordance with a previously established "subscriber ignored the message" option 147, for example by forwarding the call to a default land line number.

Late responses to the message—that is, menu selections after the predetermined time has elapsed 163, may be ignored, or the call management system may be able to respond. For example, if "voicemail with eavesdrop" is selected after the time to respond has elapsed, and the call has been transferred to the internal voicemail system as a result of the default mode 147, the center may connect the receiver of the subscriber's handset to the caller for eavesdrop and potential call pickup.

An example of a menu display is shown in FIG. 7b. The menu display includes caller information and a list of options available to the subscriber.

Alternate Embodiments

The present invention can be implemented as a computer program product that includes a computer program mechanism embedded in a computer readable storage medium. For instance, the computer program product could contain the program modules shown in FIGS. 3–6. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. For example, it will be appreciated that data channels other than those used by SMS systems may be used, such as the channels used for Wireless Application Protocol (WAP), or a dedicated data channel used only for menu presentation and option selection in call management systems. Call handling options other than those discussed may also be used, and various options may be selectable by the subscriber or determined by the call management system. A call handling device which is separate from the subscriber's handset may be used. Call handling options, default modes, and timeout periods may be personalized for different subscribers or may be set by the call management system for all subscribers or for different classes of subscribers. Various other modifications may occur to those skilled in the art without departing from the true spirit and scope of the invention as defined by the appended claims.

What is claimed is:

1. A system for managing telephone calls, comprising:
   a data channel;
   a plurality of voice channels;
   a call management system, coupled to the data channel and plurality of voice channels, the call management system including circuitry that transmits subscriber selectable menu options for handling an incoming call to a subscriber over the data channel, and for directing the incoming call over one of the voice channels in accordance with a menu option selection, such that said one of the voice channels is conserved until the incoming call is directed over one of the voice channels.

2. The system of claim 1, wherein the call management system includes call disposition logic for receiving a menu option selection transmitted by the subscriber to the call management system over the data channel and directing the incoming call in accordance with the selected menu option.

3. The system of claim 2, wherein the data channel is a short message service channel for transmitting the subscriber selectable menu options and the menu option selection to and from a wireless mobile communication device associated with the subscriber.

4. The system of claim 3, wherein the call disposition logic includes call setup logic that, in response to receiving a particular menu option selection from the subscriber, forms a connection over a voice channel between the incoming call and a default telephone number.

5. The system of claim 3, wherein the call disposition logic includes call setup logic that, in response to receiving a particular menu option selection from the subscriber, forms a connection over a voice channel between the incoming call and a telephone number entered by the subscriber.

6. The system of claim 3, wherein the call disposition logic includes call setup logic that, in response to receiving a particular menu option selection from the subscriber and an indication that at attempt to form a connection over a voice channel to a telephone number has failed, forms a connection over a voice channel between the incoming call and a voicemail system.

7. The system of claim 3, wherein the call disposition logic includes call setup logic that, in response to receiving an indication that an attempt to form a connection over a voice channel has failed, sends a message to the subscriber over the data channel.

8. The system of claim 3, wherein the call disposition logic includes call setup logic that, in response to receiving a particular menu option selection from the subscriber, forms a connection over a voice channel between the call management system and a telephone number, and then transfers the incoming call to the connection to the telephone number.

9. The system of claim 3 wherein the plurality of voice channels include wireless voice channels.

10. The system of claim 2, wherein the subscriber selectable menu options include call forwarding, transfer to voicemail, and call reject.

11. The system of claim 10, wherein the transfer to voicemail option includes transfer to a voicemail system external to the call management system.

12. The system of claim 10, wherein the menu options further include call hold and request callback.

13. The system of claim 12, wherein the call disposition logic includes call hold logic that, in response to receiving a particular menu option selection from the subscriber, informs the caller that the call will be answered shortly, holds the call until a command is received from the subscriber, and then forms a connection over a voice channel between the caller and the subscriber.

14. The system of claim 12, wherein the call management system includes voicemail logic that, in response to receiving a particular menu option selection from the subscriber, plays a message informing the caller that his call will be returned shortly and asking the caller to leave a callback number.

15. The system of claim 2, wherein the call disposition logic includes call setup logic that in response to receiving a particular menu option selection from the subscriber, forms a connection to a voicemail system external to the call management system and provides a setup message to the external voicemail system.

16. The system of claim 2, wherein the call disposition logic includes call setup logic that, in response to receiving a first particular menu option selection from the subscriber, forms a first connection over a first one of the voice channels to a voicemail system and a second connection over a second one of the voice channels to the subscriber, where the second connection is a one-way connection that enables the subscriber to listen to audio signals on the first connection.

17. The system of claim 16, wherein the call setup logic, in response to receiving a command from the subscriber, forms a third connection between the subscriber and the caller, and disconnects the first connection to the voicemail system.

18. The system of claim 1, wherein the call management system includes logic for waiting for a specified period of time for the subscriber to select a menu option and then instructing the call disposition logic to direct the call in accordance with a previously established "subscriber ignored the message" option.

19. The system of claim 1, wherein the call management system includes logic for waiting for a specified period of time to receive a delivery receipt for the menu options and then instructing the call disposition logic to direct the call in accordance with a previously established "handset off" option.

20. The system of claim 1, wherein the call management system includes circuitry that transmits caller identification information to the subscriber over the data channel.

21. The system of claim 1, wherein the call management system includes circuitry that transmits caller identification information to the subscriber over the voice channel.

22. A call management system, comprising:
a central processing unit;
a data channel interface for sending and receiving data signals over one or more data channels;
a voice channel interface for sending and receiving audio signals over one or more voice channels;
an incoming call management application which, in response to receiving an incoming call for a particular subscriber, transmits menu options for handling the incoming call to the subscriber over one of the data channels; and
a call setup application for receiving a menu option selection transmitted by the subscriber to the call management system over the data channel and directing the incoming call in accordance with the selected menu option, such that the voice channels are conserved until the incoming call is directed in accordance with the selected menu option.

23. A method of managing telephone calls, comprising:
transmitting subscriber selectable menu options for handling an incoming call from a call management system to a subscriber over a data channel;
receiving a selected menu option transmitted by the subscriber to the call management system over the data channel; and
directing the incoming call over a voice channel in accordance with the selected menu option, such that the voice channel is conserved until the incoming call is directed over said voice channel.

24. The method of claim 23, wherein the data channel is a channel for short message service for messages to and from a wireless mobile communication device associated with the subscriber.

25. The method of claim 24, wherein selectable menu options include call forwarding, transfer to voicemail, and call reject.

26. The method of claim 25, wherein the selectable menu options further include transfer to voicemail with eavesdrop.

27. The method of claim 26, wherein when the received selected menu option is the transfer to voicemail with eavesdrop option, the method includes: connecting the incoming call to a voicemail system, and to a receiver path of the wireless mobile telephone associated with the subscriber.

28. The method of claim 26, wherein when the received selected menu option is the transfer to voicemail with eavesdrop option, the method includes:
connecting the incoming call to a voicemail system, and to the receiver path of the subscriber's handset; and
in response to a command from the subscriber, connecting the incoming call to the transmitter path of the wireless mobile telephone associated with the subscriber and disconnecting the incoming call from the voicemail system.

29. The method of claim 25, wherein the transfer to voicemail option includes transfer to a voicemail system external to the call management system.

30. The method of claim 25, wherein when the received selected menu option is the call forwarding option, the method includes transferring the incoming call from the call management system to a default telephone number.

31. The method of claim 25, wherein when the receiving step includes receiving the call forwarding option and a telephone number from the subscriber, the method includes transferring the incoming call from the call management system to the telephone number.

32. The method of claim 25, wherein when the received selected menu option is the call forwarding option, the method includes:
placing a call from the call management system to a telephone number;
waiting for a response from the telephone number; and
transferring the incoming call from the call management system to the telephone number.

33. The method of claim 25, wherein when the received selected menu option is the transfer to voicemail option, the method includes: transferring the incoming call from the call management system to a voicemail system.

34. The method of claim 25, wherein when the received selected menu option is a callback option, the method includes:
playing a message informing the caller that his call will be returned shortly, and asking the caller to leave a callback number; and
forming a connection over a voice channel between the caller and a voicemail system.

35. The method of claim 24, wherein when the received selected menu option is a hold call option, the method includes:
playing a message informing the caller that his call will be answered shortly;
holding the call until a command is received from the subscriber; and
forming a connection over a voice channel between the caller and the subscriber.

36. The system of claim 24 wherein the plurality of voice channels include wireless voice channels.

37. The method of claim 23, further comprising:
waiting for a specified period of time for the menu options to be delivered to the subscriber; and
directing the call in accordance with a "handset off" option.

38. The method of claim 23, further comprising:
waiting for a specified period of time for the subscriber to select a menu option; and directing the call in accordance with a "subscriber ignored the message" option.

39. The method of claim 23, further comprising:

transmitting caller identification information to the subscriber over the data channel.

40. The method of claim 23, further comprising:

transmitting caller identification information to the subscriber over the voice channel.

41. A system for managing telephone calls, comprising:

a data channel;

a plurality of voice channels;

a call management system, coupled to the data channel and plurality of voice channels, the call management system including circuitry that transmits subscriber selectable menu options for handling an incoming call to a subscriber over the data channel, and for not directing the incoming call over one of the voice channels until a menu option selection is received that requires use of said one of the voice channels, such that said one of the voice channels is conserved until the incoming call is directed over one of the voice channels.

42. The system of claim 41, including conserving the voice channel when said menu option selection is not received.

43. The system of claim 41, wherein the data channel is a short message service channel for transmitting the subscriber selectable menu options and the menu option selection to and from a wireless mobile communication device associated with the subscriber.

44. The system of claim 43 wherein the voice channel is a wireless voice channel.

45. The system of claim 41 wherein the subscriber selectable menu options include call forwarding, transfer to voicemail, and call reject.

46. A system for managing telephone calls, comprising:

a data channel;

a plurality of voice channels;

a call management system, coupled to the data channel and plurality of voice channels, the call management system including circuitry that transmits subscriber selectable menu options for handling an incoming call to a subscriber over the data channel, and for conditionally directing the incoming call over one of the voice channels in accordance with a menu option selection when the menu option selection requires the incoming call to be directed over said one of said voice channels, such that said one of the voice channels is conserved until the incoming call is directed over said one of the voice channels.

47. The system of claim 46, including conserving the voice channel when said menu option selection is not received.

48. The system of claim 46, wherein the data channel is a short message service channel for transmitting the subscriber selectable menu options and the menu option selection to and from a wireless mobile communication device associated with the subscriber.

49. The system of claim 48 wherein the voice channel is a wireless voice channel.

50. The system of claim 46 wherein the subscriber selectable menu options include call forwarding, transfer to voicemail, and call reject.

51. A method of managing telephone calls, comprising:

transmitting subscriber selectable menu options for handling an incoming call from a call management system to a subscriber over a data channel;

waiting to receive a selected menu option transmitted by the subscriber to the call management system over the data channel, said selected menu option comprising one of said subscriber selectable menu options for handling the incoming call;

when the selected menu option is received, conditionally directing the incoming call over a voice channel in accordance with the selected menu option when the selected menu option requires the incoming call to be directed over said voice channel, such that said voice channel is conserved until the incoming call is directed over said voice channel.

52. The method of claim 51, including conserving the voice channel when said selected menu option is not received.

53. The method of claim 51, wherein the data channel is a short message service channel for transmitting the subscriber selectable menu options and the selected menu option to and from a wireless mobile communication device associated with the subscriber.

54. The method of claim 53 wherein the voice channel is a wireless voice channel.

55. The method of claim 51 wherein the subscriber selectable menu options include call forwarding, transfer to voicemail, and call reject.

* * * * *